(12) United States Patent
Bellof et al.

(10) Patent No.: US 11,989,023 B2
(45) Date of Patent: May 21, 2024

(54) METHOD FOR NAVIGATING AN INDUSTRIAL TRUCK

(71) Applicant: StreetScooter GmbH, Aachen (DE)

(72) Inventors: Marco Bellof, Aachen (DE); Bugra Turan, Aachen (DE); Sebastian Müller, Bad Salzdetfurth (DE)

(73) Assignee: StreetScooter GmbH, Aachen (DE)

( * ) Notice: Subject to any disclaimer, the term of this patent is extended or adjusted under 35 U.S.C. 154(b) by 222 days.

(21) Appl. No.: 17/072,117

(22) Filed: Oct. 16, 2020

(65) Prior Publication Data

US 2021/0116925 A1    Apr. 22, 2021

(30) Foreign Application Priority Data

Oct. 18, 2019  (DE) ...................... 10 2019 128 253.5

(51) Int. Cl.
*G05D 1/00* (2006.01)
*G01C 21/00* (2006.01)
*G01C 21/20* (2006.01)

(52) U.S. Cl.
CPC ......... *G05D 1/0212* (2013.01); *G01C 21/206* (2013.01); *G01C 21/3811* (2020.08);
(Continued)

(58) Field of Classification Search
CPC .. G05D 1/0212; G05D 1/0088; G05D 1/0231; G05D 1/0255; G05D 2201/0216;
(Continued)

(56) References Cited

U.S. PATENT DOCUMENTS 8,301,374 B2 * 10/2012 Surampudi ............ G01C 21/30
701/445
8,578,329 B1 * 11/2013 Chiluvuri .................. G06F 8/36
717/106
(Continued)

FOREIGN PATENT DOCUMENTS

CN    103370669 A    10/2013
CN    103635779 A    3/2014
(Continued)

OTHER PUBLICATIONS

German Office Action (w/ English Translation) for corresponding German Application No. DE 10 2019 128 253.5, dated Aug. 13, 2020, 14 pages.
(Continued)

*Primary Examiner* — Vivek D Koppikar
*Assistant Examiner* — Dominick Mulder
(74) *Attorney, Agent, or Firm* — Dority & Manning, PA

(57) ABSTRACT

The invention relates to a method for navigating an industrial truck in a predetermined area with the following method steps:
 providing a map of the predetermined area with at least one permanent landmark,
 entering a temporary landmark in the map, when the temporary landmark is created,
 deleting the temporary landmark from the map when the temporary landmark is removed, and
 navigating the industrial truck in the predetermined area on the basis of the map having the permanent landmark and the temporary landmark.
In this way, the navigating of a preferably autonomously or partly autonomously driving industrial truck in a predetermined area, such as at a depot, is improved and in particular is made safer and more reliable.

7 Claims, 3 Drawing Sheets

Figure 1:
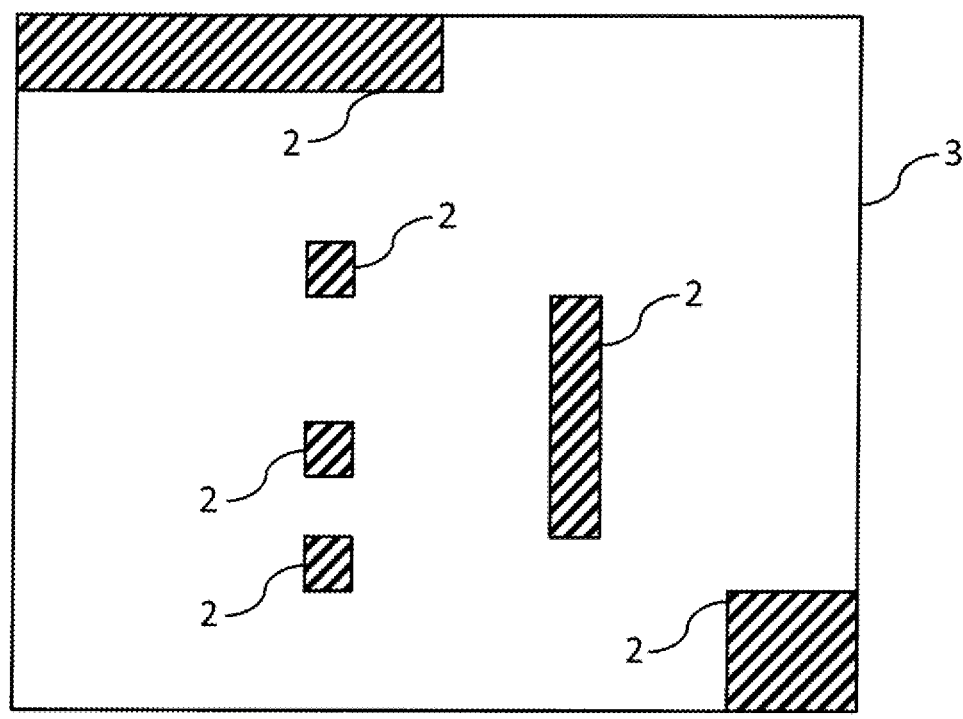

(52) U.S. Cl.
CPC ......... *G05D 1/0088* (2013.01); *G05D 1/0231* (2013.01); *G05D 1/0255* (2013.01)

(58) Field of Classification Search
CPC . G05D 1/0274; G01C 21/206; G01C 21/3811
USPC .......................................................... 701/25
See application file for complete search history.

(56) References Cited

U.S. PATENT DOCUMENTS

| | | | | |
|---|---|---|---|---|
| 10,203,409 | B2* | 2/2019 | Bueschenfeld | G01S 13/931 |
| 10,832,066 | B2* | 11/2020 | Cohen | G06T 7/593 |
| 2003/0100316 | A1* | 5/2003 | Odamura | H04W 4/029 |
| | | | | 709/219 |
| 2009/0281722 | A1* | 11/2009 | Bitonti | G06F 16/9537 |
| | | | | 701/408 |
| 2012/0194389 | A1* | 8/2012 | Faragher | G01S 5/10 |
| | | | | 342/450 |
| 2012/0287280 | A1* | 11/2012 | Essati | G01C 21/005 |
| | | | | 382/104 |
| 2014/0074342 | A1 | 3/2014 | Wong et al. | |
| 2015/0281910 | A1* | 10/2015 | Choudhury | G01C 21/206 |
| | | | | 455/456.1 |
| 2016/0109551 | A1* | 4/2016 | Faragher | G01S 19/48 |
| | | | | 701/500 |
| 2016/0161265 | A1* | 6/2016 | Bagheri | G01S 13/89 |
| | | | | 701/450 |
| 2016/0178389 | A1* | 6/2016 | Hainzlmaier | G01C 21/3644 |
| | | | | 701/467 |
| 2017/0314954 | A1* | 11/2017 | Golding | G01C 21/3644 |
| 2017/0364090 | A1* | 12/2017 | Grufman | G05D 1/0274 |
| 2018/0004769 | A1* | 1/2018 | Markiewicz | G06F 3/0652 |
| 2018/0120842 | A1* | 5/2018 | Smith | G01S 7/412 |
| 2019/0114800 | A1* | 4/2019 | Mielenz | G06V 20/56 |
| 2019/0138823 | A1* | 5/2019 | Doria | G06V 20/588 |
| 2019/0271550 | A1* | 9/2019 | Breed | F21S 41/13 |
| 2020/0033872 | A1* | 1/2020 | Burch, V | G05D 1/0088 |
| 2020/0097006 | A1* | 3/2020 | Liu | G05D 1/0088 |
| 2020/0124422 | A1* | 4/2020 | Lin Sörstedt | G01S 19/48 |
| 2020/0151611 | A1* | 5/2020 | McGavran | G06N 20/00 |
| 2020/0249032 | A1* | 8/2020 | Lee | G01C 21/32 |
| 2020/0356582 | A1* | 11/2020 | Cui | G01C 21/005 |
| 2021/0004017 | A1* | 1/2021 | Colgate | G06F 18/2155 |
| 2021/0179138 | A1* | 6/2021 | Terazawa | G01C 21/3476 |
| 2021/0180981 | A1* | 6/2021 | Matsumoto | G01C 21/3815 |
| 2021/0180987 | A1* | 6/2021 | Terada | H04W 4/029 |
| 2021/0199463 | A1* | 7/2021 | Kitahara | G01C 21/3815 |
| 2021/0310823 | A1* | 10/2021 | Wilbers | G01C 21/387 |
| 2022/0099445 | A1* | 3/2022 | Nakata | G08G 1/161 |

FOREIGN PATENT DOCUMENTS

| | | |
|---|---|---|
| CN | 103782247 A | 5/2014 |
| CN | 105698801 A | 6/2016 |
| CN | 107305129 A | 10/2017 |
| CN | 109073393 A | 12/2018 |
| CN | 110192231 A | 8/2019 |
| DE | 102 20 936 | 12/2003 |
| DE | 102 34 730 | 2/2004 |
| DE | 10 2015 011 358 | 3/2016 |
| DE | 10 2015 011 467 | 5/2016 |
| DE | 10 2016 211 625 | 12/2017 |
| DE | 10 2017 011 768 | 6/2019 |
| WO | WO 2004015510 A1 | 2/2004 |
| WO | WO2018162646 | 9/2018 |

OTHER PUBLICATIONS

Office Action (with English translation) for corresponding Application No. CN 2020110129796, dated Jul. 29, 2023, 12 pages.

* cited by examiner

METHOD FOR NAVIGATING AN INDUSTRIAL TRUCK

PRIORITY CLAIM

The present application is based on and claims priority to German Application 10 2019 128 253.5 having a filing date of Oct. 18, 2019, which is incorporated by reference herein.

The invention relates to a method for navigating an industrial truck in a predetermined area with the method steps of:
  providing a map of the predetermined area with permanent landmarks and
  navigating the industrial truck in the predetermined area on the basis of the map.

Industrial trucks are means of conveyance for horizontal transport of goods that are used at ground level. Counterparts are the overhead means of conveyance that are either suspended on hall ceilings or use rails. Nowadays, the term industrial truck is used in the relevant standards. Other sources also use the term floor conveyor. Those employed in warehouse logistics classify industrial trucks by making a basic distinction between trackless industrial trucks, such as pallet trucks, tractors, stackers, track-bound industrial trucks, such as wagons, and track-guided industrial trucks, such as driverless transporting systems. A narrower definition is given by the German employer's liability insurance association "DGUV regulation 68" (formerly BGV D27). According to this, industrial trucks are means of conveyance characterized by their type of construction in that they run with wheels on the floor and are freely steerable, are designed for transporting, pulling or pushing loads and are intended for indoor industrial use.

Logistical processes, such as the moving around of containers by industrial trucks, have the effect that the static environment of a depot where for example containers and swap bodies are left is constantly changing. As a result, known methods of locational determination are influenced and erroneous results can occur in the navigation of an autonomously driving industrial truck at the depot.

In this connection, DE 10 2015 011 358 A1 describes that autonomous vehicle manoeuvrings that are based on a digital map K continually encounter the problem of how up-to-date the digital map K is. The surrounding area around the vehicle changes, resulting in misinterpretations in locational determination on the basis of the digital map K produced at an earlier time. For example, problems may occur when using as landmarks objects that have changed over time. For example, over the seasons of a year, trees can change to such an extent that a locational determination in winter is not possible on the basis of a digital map K recorded in summer. Another example is that of dynamic objects, i.e. objects which, though immovable when the digital map K was produced, and therefore recorded as relevant objects, are however movable, for example other vehicles which at a later time, after production of the digital map K, are no longer at the location recorded during the production of the digital map K. This concerns for example vehicles in public car parks, which at various times are present or not present in the car park because of changing occupancy of the parking spaces.

Furthermore, DE 10 2016 211 625 A1 describes a method and a system for using parked vehicles as landmarks for advantageously influencing the robustness of systems for determining the location of vehicles. It proposes a method for producing a digital map for the locational determination of moving motor vehicles, at least one stationary motor vehicle being used as a landmark intended for locational determination. The stationary motor vehicle as a landmark in this case transmits to a server information about its position on the digital map, in particular about its position in relation to at least one second landmark locationally determined on the digital map.

Specifically, DE 10 2016 211 625 A1 explains in this respect that, on account of the frequent change of location of the vehicles parking, changing of the digital map may often be necessary in order to guarantee a necessary accuracy of the locational determination. Therefore, in such cases a vehicle would have to keep driving over the trajectory in order to record the new objects on the map, which represents a great amount of additional effort. In the procedure for producing a digital map for locational determination of moving motor vehicles, at least one stationary motor vehicle is used as a landmark intended for the locational determination. The stationary motor vehicle in this case transmits to a server information about its position on the digital map as a landmark, in particular about its position in relation to at least one second landmark locationally determined on the digital map. This so-called communication allows the stationary motor vehicles themselves to transmit their location, and they do not have to be only recorded in the first instance by other motor vehicles. This better ensures that the digital map is up-to-date, which in turn has the consequence of increasing accuracy of the locational determination for the motor vehicles using the digital map.

DE 10 2017 105 086 A1 describes how the updating of landmark maps is to be improved. For this purpose, a vehicle drives over an area, the area is recorded by the vehicle, obtaining area data and obtaining vehicle position data of the vehicle in the area. A presence or absence of a landmark in the area data that has changed as compared with the landmark map is determined with reference to the vehicle position data. Finally, the landmark map is updated with reference to the landmark.

DE 10 2015 011 467 A1 describes a method for producing a digital map of a space for parking. According to the invention, map data, concerning the space for parking, and parking-space trajectory data are recorded by means of a plurality of vehicles and transmitted to a central location for producing a digital map, the central location transmitting the digital map and a respective parking-space trajectory to a vehicle that is to be parked.

The object of the invention is to improve the navigating of a preferably autonomously or partly autonomously driving industrial truck in a predetermined area, such as at a depot, and in particular to make it safer and more reliable.

This object is achieved by the subject matter of Patent claim 1. Preferred developments of the invention are described in the subclaims.

According to the invention, consequently, a method for navigating an industrial truck in a predetermined area with the following method steps is provided:
  providing a map of the predetermined area with at least one permanent landmark,
  entering a temporary landmark in the map when the temporary landmark is created,
  deleting the temporary landmark from the map when the temporary landmark is removed, and
  navigating the industrial truck in the predetermined area on the basis of the map having the permanent landmark and the temporary landmark.

This provides a method which can be used for example even at busy depots where for example industrial trucks, swap bodies, trailers and/or containers are temporarily left.

The invention makes it possible also to take into account in the navigation these only temporarily present landmarks, which makes the navigation easier, safer and more reliable. In particular, according to a preferred development of the invention, it is provided that the map has a plurality of temporary landmarks. Equally, according to a preferred development of the invention, it is provided that the map has a plurality of permanent landmarks.

Preferably, the temporary landmark is an industrial truck that has been left, a swap body that has been left, a trailer that has been left or a container that has been left. Moreover, the method is preferably used for a multiplicity of industrial trucks to be navigated and for a multiplicity of temporary landmarks, to be precise preferably at least partially at the same time for a plurality of industrial trucks.

The permanent landmark may in principle be entered in the map in various ways, for example by means of a single coordinate point. According to a preferred development of the invention, the permanent landmark is however entered in the map by means of such geographical coordinates that describe the position of the two-dimensional or three-dimensional spatial extent of the permanent landmark. In particular in the case of relatively large permanent landmarks, it can in this way be achieved that the navigation of the industrial truck is further improved with respect to precision and reliability. It is preferably provided that the identification uniquely identifying the temporary landmark is linked with such geographical coordinates that describe the two-dimensional or three-dimensional spatial extent of the temporary landmark. According to a preferred refinement of the invention, the geographical coordinate of the temporary landmark may comprise at least one geographical coordinate of the setdown place where the created landmark has been left that is determined in a satellite-assisted or radio-assisted manner.

According to a preferred development of the invention, it is also provided that the step of entering the temporary landmarks in the map when the temporary landmark is created comprises the following:
 transferring to the map an identification uniquely identifying the temporary landmark and
 transferring to the map at least one geographical coordinate of the temporary landmark created.

The identification of the landmark in this case preferably comprises the type of landmark, such as for example the type or size of a pallet or the type or size of a container. The geographical coordinate of the temporary landmark created may however also simply be an identification, such as a number of the setdown place, that uniquely identifies the setdown place. To this extent, it is preferably therefore also provided that the geographical coordinate comprises an identification uniquely identifying the setdown place of the temporary landmark created.

Similarly, the identification uniquely identifying the landmark left may be a number uniquely identifying the landmark, such as the container number uniquely identifying a maritime container produced in accordance with ISO 668. This container number consists of the owner or operator code, the equipment category identifier, the serial number and the check digit.

Moreover, according to a preferred development of the invention, it is provided that the step of entering the temporary landmarks in the map when the temporary landmark is created also comprises:
 entering in the map geometrical and/or optical characteristics of the temporary landmark.

This can make it easier to find the temporary landmark again or identify the temporary landmark when it is to be retrieved, that is to say picked up again.

According to a preferred refinement of the invention, it also applies that the step of creating a temporary landmark comprises the following step:
 classifying and/or measuring the temporary landmark for re-identification.

Classifying the temporary landmark may for example be based on the type of landmark, that is for example based on a classification as a forklift, container or pallet. Both the classifying of the temporary landmark and the measuring of the temporary landmark can make it easier for the temporary landmark to be identified again when it is to be picked up again.

It is also preferably provided that the step of creating the temporary landmark comprises the following step:
 guessing the setdown position of the temporary landmark on the basis of the pose of the industrial truck.

In this way, the setdown position does not have to be determined separately, but all that is required is information about the industrial truck, specifically about its pose.

It is also preferably provided that the step of removing the temporary landmark comprises the following steps:
 identifying the temporary landmark by the industrial truck by means of an optically identifiable feature of the temporary landmark, and
 transporting the temporary landmark away by the industrial truck after positive identification of the temporary landmark.

It applies with particular preference that the optically identifiable feature of the temporary landmark is formed by an optically detectable code applied or attached to the temporary landmark and/or by characteristics of the wheel caps of the temporary landmark.

When removing the temporary landmark, it also applies that the step of removing the temporary landmark preferably also comprises the following step:
 guessing the pose of the temporary landmark.

This makes it easier for the industrial truck to drive to the temporary landmark. The step of guessing the pose of the temporary landmark is preferably performed in this case by means of scan matching and/or by means of a particle filter, though in principle all standard algorithms would be possible of course.

According to a preferred development of the invention, it is also provided that the step of transferring to the map the geographical coordinate of the temporary landmark created is performed from the created temporary landmark itself or from the industrial truck that has created the temporary landmark. This makes the method particularly easy, since in this way no additional devices have to be provided for the method according to the invention.

The map may in principle be maintained in different places, for example in an industrial truck or else in a number of industrial trucks at the same time. According to a preferred development of the invention, the map is however maintained centrally in a central unit. The entering of a temporary landmark in the map when the temporary landmark is created consequently means transferring corresponding information to the central unit. Such a central unit, acting as it were as a common server, makes the method easier and reduces the expenditure on hardware.

Entering the temporary landmark into the map may be performed at different times and on different occasions. According to a preferred refinement of the invention, the steps of entering the temporary landmarks in the map when the temporary landmark is created and deleting the temporary landmarks from the map when the temporary landmark is removed are performed in real time. In this way, a particularly great benefit can be derived from the map, since it means that up-to-date map data that reflect the current situation in the predetermined area are almost always available.

In principle, a great variety of devices come into consideration as permanent landmarks. Preferably, a permanent landmark is formed by a building, a topographical object, a marking, a sign or a delimitation of the predetermined area. It also applies that the industrial truck is preferably an autonomously or partly autonomously driving vehicle.

Moreover, it is preferably also provided that, for navigating with the aid of the map, the vehicle determines its position by means of coordinates determined in a satellite-assisted or radio-assisted manner, for example by means of DGPS coordinates. For navigating in relation to other non-parked vehicles, the industrial truck is preferably equipped with an optical camera, with a LIDAR sensor and/or with ultrasound sensors.

Figure 2:
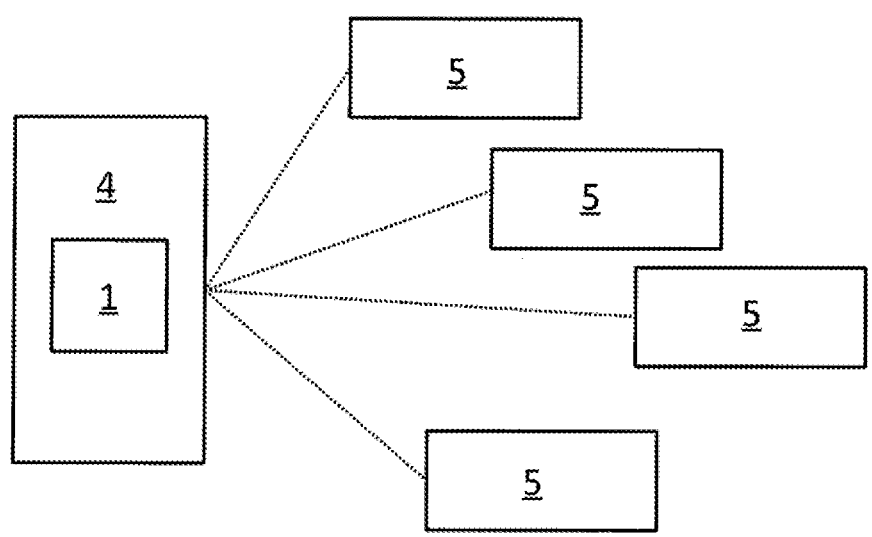
Figure 3:
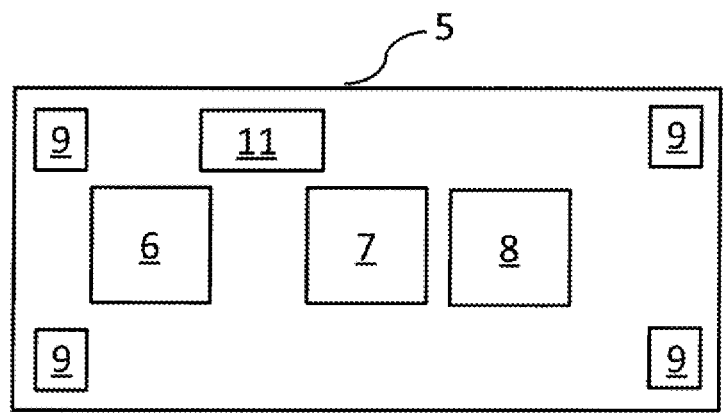
Figure 4:
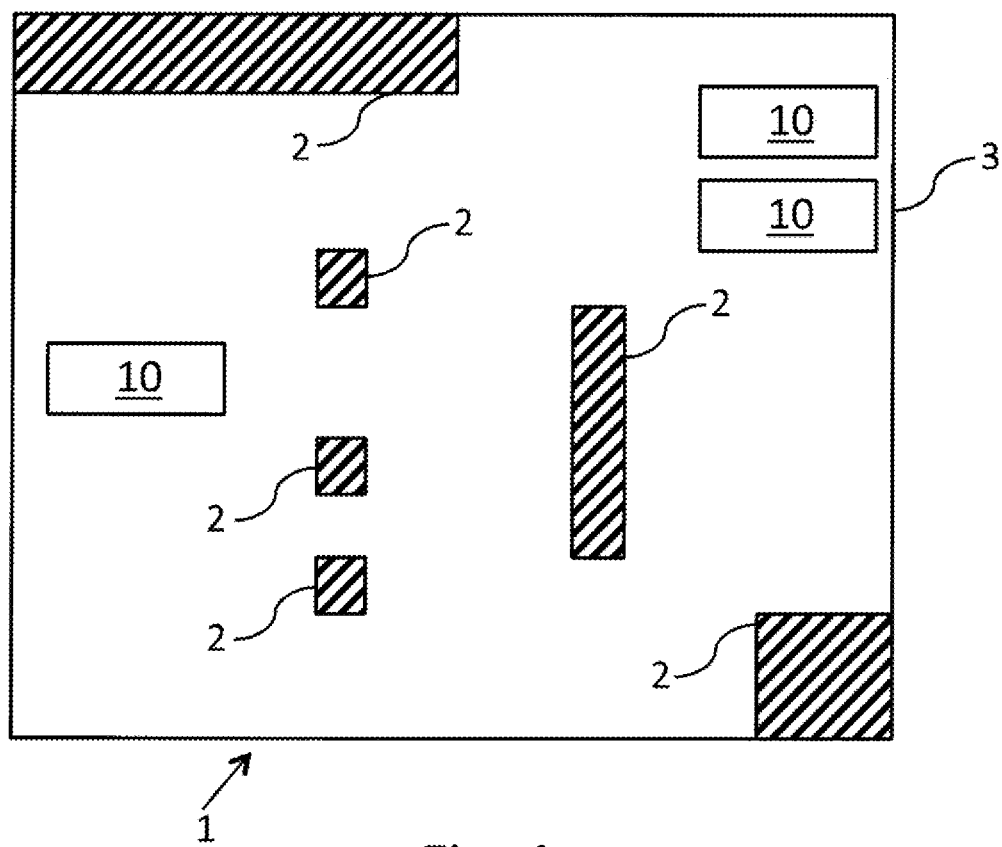
Figure 5:
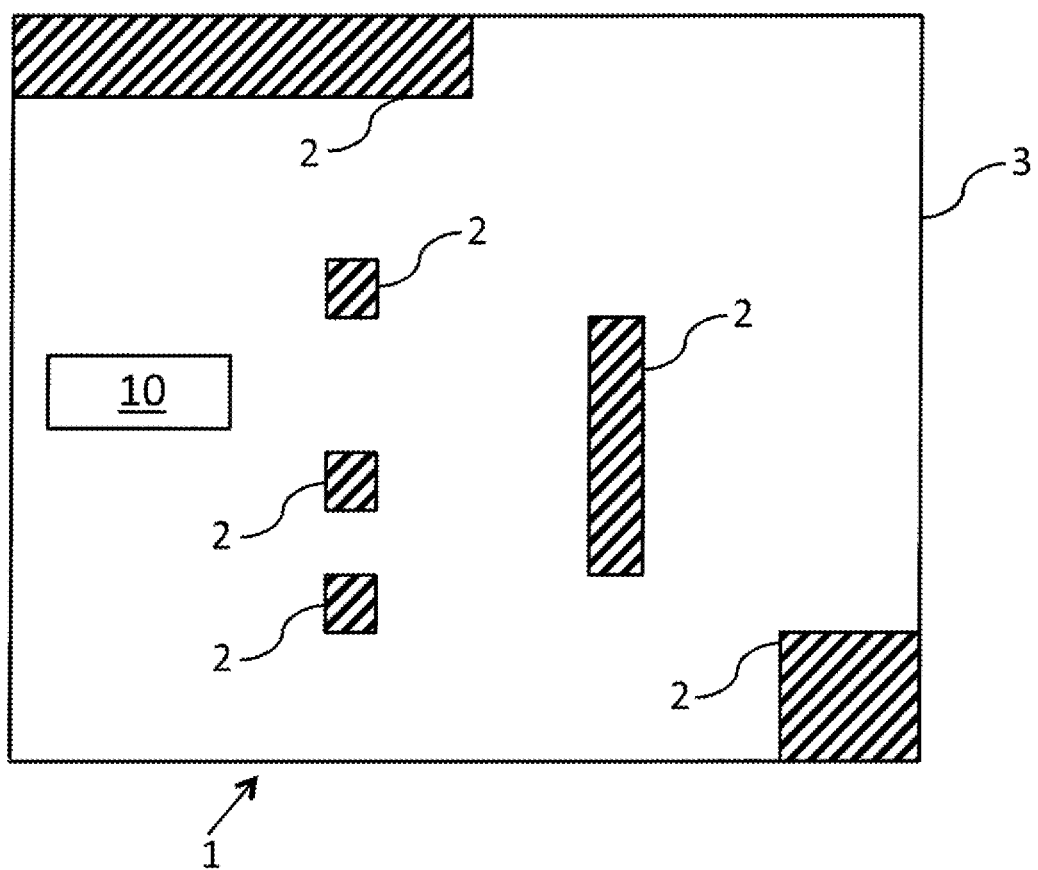

The invention is explained in further detail below on the basis of a preferred exemplary embodiment with reference to the drawings, in which:

FIG. 1 schematically shows a map with permanent landmarks according to a preferred exemplary embodiment of the invention, FIG. 2 schematically shows a central unit according to the preferred exemplary embodiment of the invention described in the present case, which central unit communicates by radio with a plurality of industrial trucks, FIG. 3 schematically shows an industrial truck according to the preferred exemplary embodiment of the invention described in the present case, FIG. 4 schematically shows a map with permanent landmarks and with temporary landmarks according to the preferred exemplary embodiment of the invention described in the present case and FIG. 5 schematically shows the map from FIG. 4, from which temporary landmarks have been deleted again.

FIG. 1 schematically illustrates with regard to the preferred exemplary embodiment of the invention described here a map 1 of an area of a depot which has essentially a rectangular outer delimitation 3, within which a plurality of permanent landmarks 2 have already been entered. The map 1 indicates the geographical coordinates of the two-dimensional delimitations of these permanent landmarks 2 and also the geographical coordinates of the outer delimitation 3 of the depot. These permanent landmarks may be for example buildings, topographical objects, markings and signs. The permanent landmarks 2 have in common that they delimit the area of the depot in which industrial trucks 5 can move. In other words, the permanent landmarks 2 represent obstacles that have to be taken into account by industrial trucks 5 when driving around the depot and in corresponding navigation within the depot. Moreover, the outer delimitation 3 of the depot of course also represents a permanent landmark in practice, because the industrial trucks 5 should not or cannot drive beyond this outer delimitation 3 when they are driving around the depot.

As schematically illustrated by FIG. 2, this map 1 is kept and maintained centrally in a central unit 4. This central unit 4 is connected by radio to all of the industrial trucks 5 that move within the depot. The radio links are represented in FIG. 2 by dotted lines. In this way, all of these industrial trucks 5 have access to the map 1, and consequently to the navigation information available on the basis of the map 1. Moreover, on account of their respective radio link with the central unit 4, the industrial trucks 5 can also send information to the central unit 4 to update or supplement the map data. Since, as stated above, the map 1 has the permanent landmarks 2 of the depot and also the outer delimitation 3 of the depot, it is possible for the industrial trucks 5 to navigate within the depot without coming into conflict with the permanent landmarks 2.

FIG. 3 schematically shows one of the industrial trucks 5 that are moving within the depot. This industrial truck 5 has a GPS receiver 6 for satellite navigation. By means of the satellite navigation, the industrial truck 5 can establish the geographical coordinates of the location at which it is at the particular time. This allows the industrial truck 5 to navigate within the depot with the aid of the map 1. Moreover, the industrial truck 5 has further sensors, specifically an optical camera 7, a LIDAR sensor 8 and a plurality of ultrasound sensors 9. These further sensors allow the industrial truck 5 to record its surrounding area in real time, so that also other industrial trucks 5 driving in the depot can be detected and dynamically taken into account for the navigation within the depot. Altogether, this allows fully autonomous driving of the industrial truck 5 within the depot.

Furthermore, the industrial truck 5 has a radio unit 11, in order to be able to communicate with the central unit by radio. The other industrial trucks 5 for the depot, which are shown schematically in FIG. 2, are correspondingly equipped with a radio unit 11 for communication with the central unit 4, a GPS receiver 6 for satellite navigation and with an optical camera 7, a LIDAR sensor 8 and a plurality of ultrasound sensors 9, in order to be able to record their dynamically changing surrounding area.

In the case of the preferred exemplary embodiment of the invention described here, the task of the industrial trucks 5 is to set down and possibly later pick up again devices such as containers, swap bodies and pallets within the depot. These devices that are at least temporarily left within the depot represent temporary landmarks, which consequently must be likewise taken into account by industrial trucks 5 in their navigation within the depot. Moreover, the industrial trucks 5 require information about the location at which a specific device has been left when this device is to be retrieved again. To this extent, it is provided according to the preferred exemplary embodiment of the invention described here that, as schematically shown in FIG. 4, temporary landmarks 10 are entered in the map 1 kept and maintained centrally in the central unit 4 when they are created. Starting from a previously empty depot, that is to say a depot that does not yet contain any temporary landmark, as shown in FIG. 1, FIG. 4 then already shows three temporary landmarks 10, corresponding to three devices that have in the meantime been left within the depot by means of the industrial trucks 5. The temporary landmarks 10 are in the present case swap bodies that have been left within the depot.

The entering of the temporary landmarks 10 in the map 1 is thus performed in the present case in that the industrial truck 5 that has left the respective swap body at the depot informs the central unit 4 by radio immediately after leaving the swap body that it has left this swap body at the respective setdown place. For this purpose, the industrial truck 5 transmits to the central unit 4 a unique identification of the respective swap body and also the geographical coordinates of the swap body that has been left, which two-dimensionally identify the outer delimitation of the setdown area of the respective swap body. This information is correspondingly entered in the map 1 in the central unit 4.

Instead of the geographical coordinates, it is of course also possible to transfer only an identification of the setdown place, that is to say for example "setdown place 45", if the central unit 4 contains information disclosing where the respective setdown places can be found in the map. Moreover, instead of a unique identification of the swap body, it is also possible to transfer to the central unit 4 only the type of swap body, such as "type C", or the dimensions of the swap body. In the transfer of the type of swap body to the central unit 4, it is of course again required that the central unit 4 contains information that, with the indication of the type, allows the swap body to be entered in the map 1 as a temporary landmark 10 such that it can be identified what space or what surface area it takes up within the depot and what space or what surface area must to this extent be taken into account by the industrial trucks 5 as being not accessible when they are driving within the depot.

Finally, FIG. 5 illustrates that temporary landmarks 10 entered in the map 1 are also deleted again from the map 1 when they are removed, that is to say when a corresponding swap body is retrieved and either removed from the depot or moved to somewhere else in the depot. As FIG. 5 illustrates, here the two temporary landmarks 10 that were still represented at the top right in the map 1 in FIG. 4 are no longer present, because they have been removed from the depot by an industrial truck 5. The deleting of these temporary landmarks 10 from the map 1 has in this case been performed in such a way that, immediately after loading the respective swap body onto the industrial truck 5, the central unit 4 has been notified by radio by the corresponding industrial truck 5 that the swap body is no longer at its previous setdown location and the corresponding temporary landmark 10 has consequently been removed.

Altogether, in this way the navigating of the autonomously driving industrial trucks 5 in the depot is clearly improved in an easy way, specifically made safer and more reliable, since it is brought about in real time by the industrial trucks 5 driving at the depot that temporary landmarks 10, in the present case in the form of swap bodies, are entered in the map 1 or deleted again when they are created and removed again. Moreover, the method described in the present case can also make it considerably easier to find and drive to the swap bodies.

LIST OF DESIGNATIONS

1 Map
2 Permanent landmarks
3 Outer delimitation
4 Central unit
5 Industrial trucks
6 GPS receiver
7 Optical camera
8 LIDAR sensor
9 Ultrasound sensors
10 Temporary landmarks
11 Radio unit

The invention claimed is:

1. Method for navigating an industrial truck in a predetermined area with the following method steps:
providing a map of the predetermined area with at least one permanent landmark, wherein the map is maintained in a central unit located outside of the industrial truck,
entering a temporary landmark in the map, when the temporary landmark is created, wherein the temporary landmark is a parked industrial truck, a parked swap body, a parked trailer or a parked container,
deleting the temporary landmark from the map when the temporary landmark is removed, and
navigating the industrial truck in the predetermined area on the basis of the map having the permanent landmark and the temporary landmark,
wherein the step of entering the temporary landmark in the map when the temporary landmark is created comprises: transferring to the map at least one geographical coordinate of the temporary landmark created, wherein the temporary landmark also determines its geographical coordinates, and wherein the step of transferring to the map the geographical coordinate of the temporary landmark created is performed from the created temporary landmark itself,
wherein the steps of entering the temporary landmark in the map when the temporary landmark is created and/or of deleting the temporary landmark from the map when the temporary landmark is removed is performed in real time,
wherein the step of entering the temporary landmark in the map comprises the industrial truck communicating with the central unit via a radio unit and a GPS receiver, and
wherein the radio unit comprises a radio transmitter configured to transmit a radio signal and the central unit comprises a central unit transmitter and a central unit receiver configured to receive the radio signal.

2. Method according to claim 1, wherein the permanent landmark and/or the temporary landmark is entered in the map by means of such geographical coordinates that describe the position of the two-dimensional or three-dimensional spatial extent of the permanent landmark and the temporary landmark, respectively.

3. Method according to claim 1, wherein the step of entering the temporary landmark in the map when the temporary landmark is created comprises:
transferring to the map an identification uniquely identifying the temporary landmark.

4. Method according to claim 1, wherein the step of entering the temporary landmarks in the map when the temporary landmark is created also comprises:
entering in the map geometrical and/or optical characteristics of the landmark.

5. Method according to claim 1, wherein the industrial truck is an autonomously or partly autonomously driving vehicle.

6. Method according to claim 1, wherein the step of creating a temporary landmark comprises the following steps:
classifying and/or measuring the temporary landmark for re-identification of the landmark and
entering the classification result or the measurement result in the map.

7. Method according to claim 1, wherein the step of creating the temporary landmark comprises the following step:
guessing a setdown position of the temporary landmark on the basis of the pose of the industrial truck and
entering in the map the guessed setdown position of the temporary landmark.

* * * * *